(12) United States Patent
Vieira et al.

(10) Patent No.: US 6,779,450 B1
(45) Date of Patent: Aug. 24, 2004

(54) THIN-WALL DRUM FOR EXTERNAL DRUM IMAGING SYSTEM

(75) Inventors: Michael G. Vieira, Lowell, MA (US); Amy Pietrzak, Londonderry, NH (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 10/419,494

(22) Filed: Apr. 21, 2003

(51) Int. Cl.$^7$ .......................... B41F 13/08; F16C 13/00
(52) U.S. Cl. ............... 101/375; 101/401.1; 101/415.1; 492/57; 492/47
(58) Field of Search .......................... 101/216, 217, 101/375, 376, 407.1, 409, 401.1, 477, 415.1; 492/28, 47, 48, 57, 58, 59; 29/895, 895.22

(56) References Cited

U.S. PATENT DOCUMENTS

| | | |
|---|---|---|
| 2,519,105 A | 8/1950 | Blue |
| 2,787,956 A | 4/1957 | Kirby et al. |
| 5,012,730 A | 5/1991 | Schiel |
| 5,133,125 A | 7/1992 | Diebels et al. |
| 5,229,813 A | 7/1993 | Cherian |
| 5,379,693 A | 1/1995 | Hoffmann et al. |
| 5,507,228 A | 4/1996 | Schulz |
| 5,739,900 A | 4/1998 | Isobe |
| 6,250,221 B1 | 6/2001 | Tice |
| 6,435,087 B1 | 8/2002 | Glockner |
| 2002/0144618 A1 * | 10/2002 | Fukui .......................... 101/477 |
| 2002/0185027 A1 | 12/2002 | Grager et al. |
| 2003/0167945 A1 * | 9/2003 | Hashiguchi et al. ........ 101/375 |

FOREIGN PATENT DOCUMENTS

GB 2 073 850 A * 10/1981

* cited by examiner

*Primary Examiner*—Leslie J. Evanisko
(74) *Attorney, Agent, or Firm*—John A. Merecki; Robert A. Sabourin

(57) ABSTRACT

A thin wall external drum for an external drum imaging system includes a cylindrical portion having a hollow tube and a pair of end plates mounted to opposing sides of the hollow tube, wherein the hollow tube has the wall thickness less than or equal to about 1.5 percent of the outside diameter of the external drum.

12 Claims, 6 Drawing Sheets

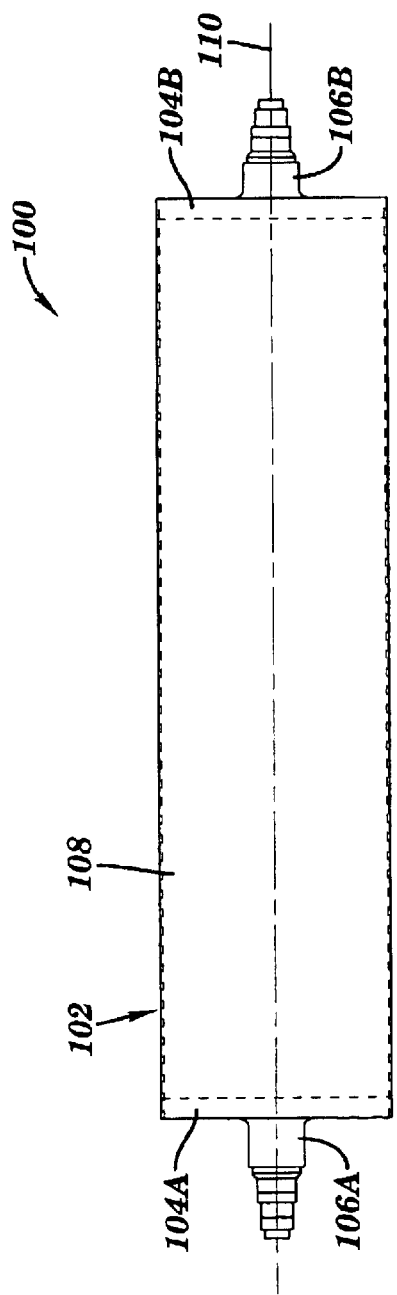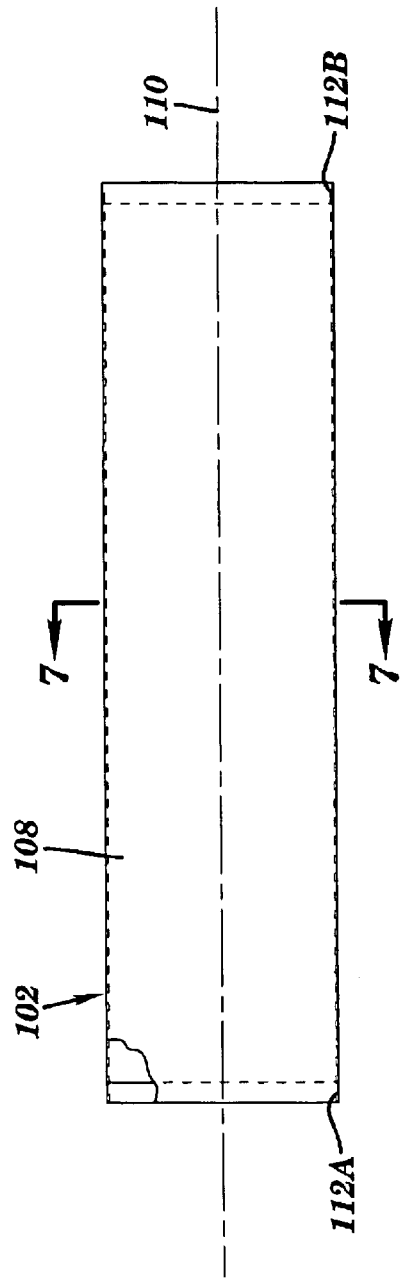

THIN-WALL DRUM FOR EXTERNAL DRUM IMAGING SYSTEM

FIELD OF THE INVENTION

The present invention is in the field of imaging systems. More particularly, the present invention provides a thin-wall drum for an external drum imaging system.

BACKGROUND OF THE INVENTION

In external drum imaging systems, a movable optical carriage is commonly used to displace an image recording source in a slow scan direction while a cylindrical drum, having recording media mounted on an external surface thereof, is rotated with respect to the image recording source. The drum rotation causes the recording media to advance past the image recording source along a fast scan direction that is substantially perpendicular to the slow scan direction.

The image recording source may include an optical system for generating one or more imaging beams that are scanned across the surface of the recording media. Each imaging beam may be separately modulated according to a digital information signal representing data corresponding to the image to be recorded.

The recording media to be imaged by an external drum imaging system is commonly supplied in discrete, flexible sheets, hereinafter collectively referred to as "printing plates." Each printing plate may comprise one or more layers supported by a support substrate, which for many printing plates is a plano-graphic aluminum sheet. Other layers may include one or more image recording (i.e., "imageable") layers such as a photosensitive, radiation sensitive, or thermally sensitive layer, or other chemically or physically alterable layers. Printing plates that are supported by a polyester support substrate are also known and can be used in the present invention. Printing plates are available in a wide variety of sizes, typically ranging, e.g., from 9"×12", or smaller, to 58"×80", or larger.

A cassette is often used to supply a plurality of unexposed printing plates to an external drum imaging system. The printing plates are normally supplied in stacks of ten to one hundred, depending upon plate thickness, and are stored in the cassette. A plate manager may be used to automatically and selectively unload and feed a printing plate from a plurality of different cassettes to the external drum imaging system for imaging.

The throughput of an external drum imaging system (e.g., the number of plates/hour that can be imaged by the system) is dependent upon a multitude of factors. For example, the time required for a stationary external drum to be rotated up to the speed required for imaging (e.g., 100–1000 revolutions per minute (rpm)), or conversely, the time required to bring a rotating external drum to a stop to remove imaged recording media and then load new recording media, greatly affects the throughput of the imaging system.

The throughput of the imaging system may be increased, therefore, by increasing the rotational (angular) acceleration/deceleration of the external drum. This may be achieved, for example, by using larger and more powerful drive motors, power supplies, braking systems, etc. Unfortunately, this tends to greatly increase the complexity, cost, size, etc., of the imaging system. Alternately, or in addition, the weight of the drum itself can be reduced. One example of a light-weight external drum for an imaging system is disclosed in U.S. Pat. No. 6,250,221, incorporated herein by reference. The external drum in this patent is formed from aluminum using an extrusion process. Although lighter than previously available external drums, this drum is fairly expensive to manufacture.

There is a need, therefore, for a drum that is both light-weight and less-expensive to produce, and which can be used for the high resolution imaging of printing plates in an external drum imaging system.

SUMMARY OF THE INVENTION

The present invention provides a thin-wall drum for an external drum imaging system.

Generally, the present invention provides an apparatus comprising an external drum for supporting a printing plate to be imaged by an imaging system, wherein the external drum has a wall thickness less than or equal to about 1.5 percent of an outside diameter of the external drum.

The present invention also provides an external drum platesetter comprising an external drum having a media support surface and a scanning system for imaging data onto a printing plate mounted on the media support surface of the external drum, wherein the external drum has a wall thickness less than or equal to about 1.5 percent of an outside diameter of the external drum.

BRIEF DESCRIPTION OF THE DRAWINGS

The features of the present invention will best be understood from a detailed description of the invention and embodiments thereof selected for the purpose of illustration and shown in the accompanying drawings in which:

FIG. 3 illustrates a thin-wall external drum in accordance with an embodiment of the present invention.

FIG. 4 illustrates the cylindrical portion of the thin-wall external drum of FIG. 3.

DETAILED DESCRIPTION OF THE INVENTION

Figure 1:
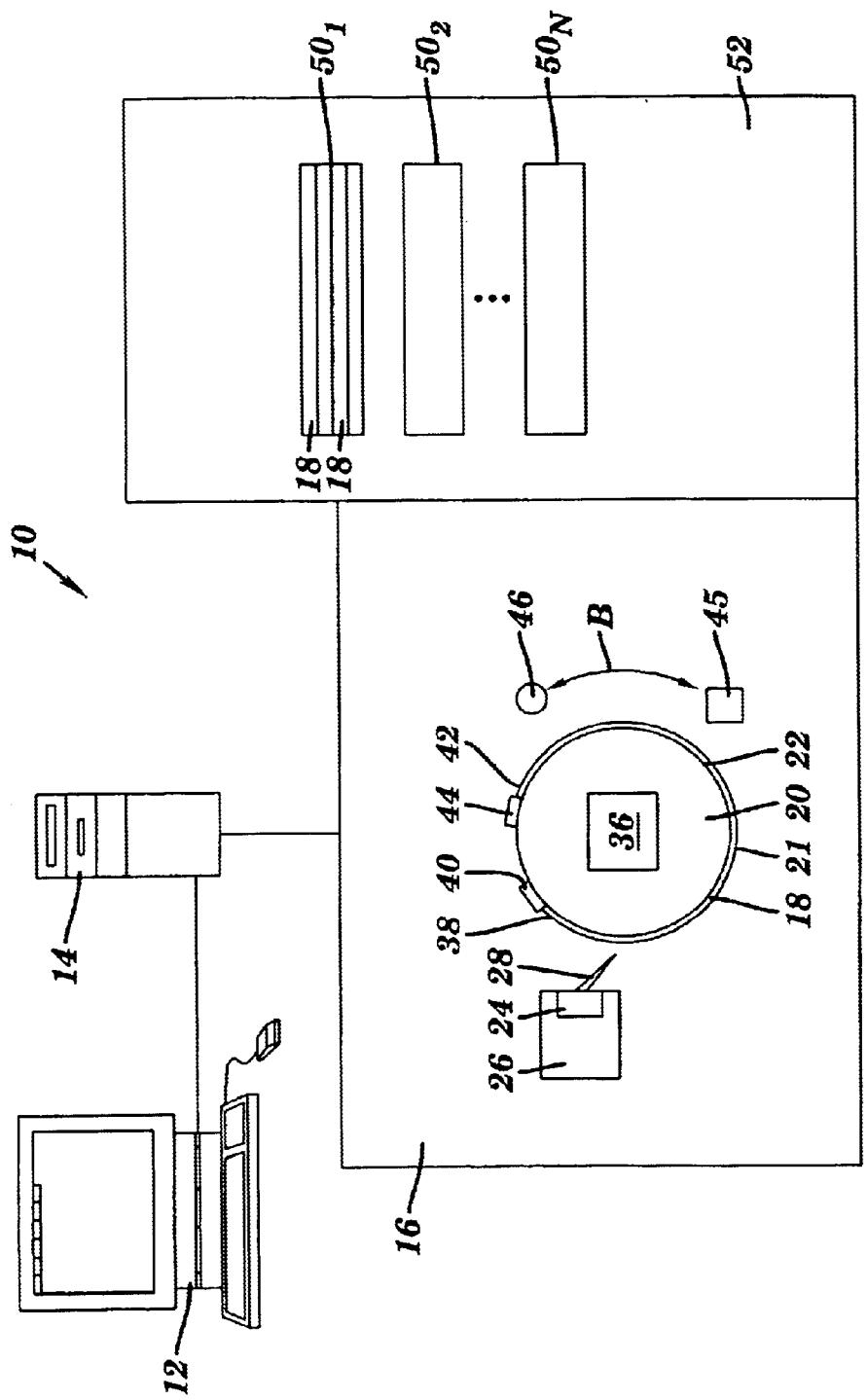
FIG. 1 illustrates an external drum imaging system for recording images onto a supply of recording media such as a printing plate.

The features of the present invention are illustrated in detail in the accompanying drawings, wherein like reference numerals refer to like elements throughout the drawings. Although the drawings are intended to illustrate the present invention, the drawings are not necessarily drawn to scale.

An example of an external drum imaging system 10 is illustrated in FIG. 1. In this example, the imaging system 10 comprises an external drum platesetter configured to record digital data onto a printing plate.

The imaging system 10 generally includes a front end computer or workstation 12 for the design, layout, editing, and/or processing of digital files representing pages to be printed, a raster image processor (RIP) 14 for further processing the digital pages to provide rasterized page data (e.g., rasterized digital files) for driving an image recorder, and an image recorder or engine, such as an external drum platesetter 16, for recording the rasterized digital files onto a printing plate or other recording media. The external drum platesetter 16 records the digital data (i.e., "job") provided by the RIP 14 onto a supply of photosensitive, radiation sensitive, thermally sensitive, or other type of suitable printing plate 18.

A plurality of printing plates 18 are stored in one or more cassettes $50_1$–$50_N$, located within a plate manager 52. The plate manager 52 is used to automatically and selectively unload and feed a printing plate 18 from one of the cassettes $50_1$–$50_N$, to the external drum platesetter 16 for mounting and subsequent imaging.

Figure 2:
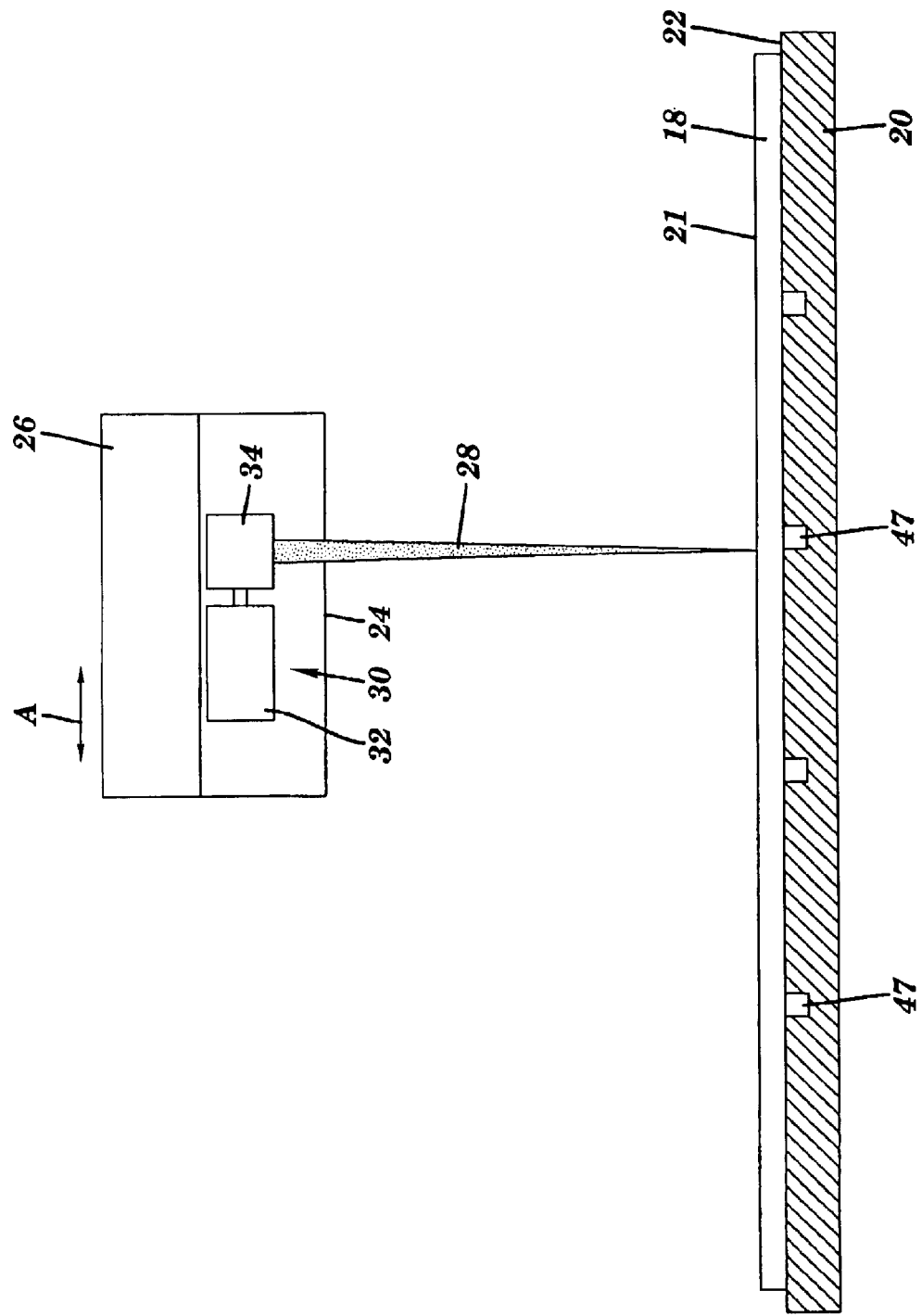
FIG. 2 illustrates an example of an imaging system including a movable optical carriage and scanning system, usable in the external drum imaging system of FIG. 1.

The external drum platesetter 16 includes an external drum 20 having a cylindrical media support surface 22 for supporting a printing plate 18 during imaging. The external drum platesetter 16 further includes a scanning system 24, coupled to a movable carriage 26, for recording digital data onto the imaging surface 21 of the printing plate 18 using one or more imaging beams 28. An example of a scanning system 24 is illustrated in FIG. 2. In particular, the scanning system 24 is displaced by the movable carriage 26 in a slow scan axial direction (directional arrow A) along the length of the rotating external drum 20 to expose the printing plate 18 in a line-wise manner when a single beam is used or in a section-wise manner for multiple beams. Other types of imaging systems may also be used in the present invention.

The external drum 20 is rotated by a drive system 36 in a clockwise or counterclockwise direction as indicated by directional arrow B in FIG. 1. Typically, the drive system 36 rotates the external drum 20 at a rate of about 100–1000 rpm. As further illustrated in FIG. 2, the scanning system 24 typically includes a system 30 for generating the imaging beam or beams 28. The system 30 comprises a light or radiation source 32 for producing the imaging beam or beams 28 (illustrated for simplicity as a single beam), and an optical system 34 positioned between the radiation source 32 and the media support surface 22 for focusing the imaging beam or beams 28 onto the printing plate 18. It should be noted, however, that the system 30 described above is only one of many possible different types of scanning systems that may be used to record image data on the printing plate 18.

In the external drum imaging system 10 shown in FIG. 1, the leading edge 38 of the printing plate 18 is held in position against the media support surface 22 by a leading edge clamping mechanism 40. Similarly, the trailing edge 42 of the printing plate 18 is held in position against the media support surface 22 by a trailing edge clamping mechanism 44. Both the trailing edge clamping mechanism 44 and the leading edge clamping mechanism 40 provide a tangential friction force between the printing plate 18 and the external drum 20 sufficient to resist the tendency of the edges of the printing plate 18 to pull out of the clamping mechanisms 40, 44, at a high drum rotational speed. Other known systems for mounting the printing plate 18 onto the external drum 20 may also be used.

An ironing roller system 46 may be provided to flatten the printing plate 18 against the media support surface 22 of the external drum 20 as the external drum 20 rotates past the ironing roller 46 during the loading of the printing plate 18. Alternately, or in addition, a vacuum source 45 may be used to draw a vacuum through an arrangement of ports and vacuum grooves 47 (see, e.g., FIG. 2) formed in the media support surface 22 to hold the printing plate 18 against the media support surface 22. A registration system (not shown), comprising, for example, a set of registration pins or stops on the external drum 20, and a plate edge detection system (not shown), may be used to accurately and repeatably position and locate the printing plate 18 on the external drum 20.

A thin-wall external drum 100 in accordance with an embodiment of the present invention is illustrated in FIG. 3. The thin-wall external drum 100 includes a cylindrical portion 102 and a pair of end plates 104A, 104B. Each end plate 104A, 104B, includes a corresponding journal 106A, 106B, respectively. The journals 106A, 106B, may be male as shown in FIG. 3, or may be female.

Figure 7:
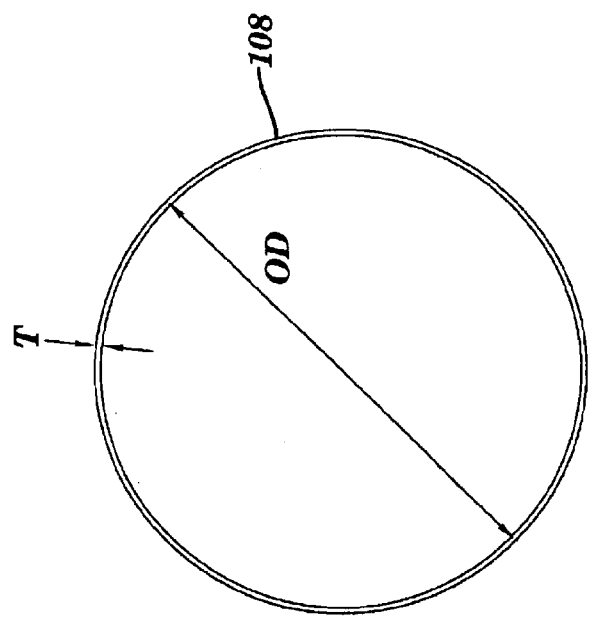
FIG. 7 is a cross-sectional view of the cylindrical portion of the thin-wall external drum taken along line 7—7 of FIG. 4.

As illustrated in FIGS. 4 and 7, the cylindrical portion 102 of the thin-wall external drum 100 comprises a thin-wall hollow tube 108. The tube 108 is formed from a flat-stock metal material, such as 1026 annealed steel, that is rolled, welded on seam, and machined to the appropriate dimensions and tolerances. The tube 108 is plated with a corrosion and wear-resistant material, such as electroless nickel or the like. This type of manufacturing method is less expensive to use than the extrusion process disclosed in U.S. Pat. No. 6,250,221. The use of steel rather than aluminum also reduces the cost of the thin-wall external drum 100 compared to the extruded aluminum drum disclosed in U.S. Pat. No. 6,250,221.

The tube 108 is reinforced only where it is adjoined to the axis of rotation 110 of the external drum 100. This reinforcement is provided by the pair of end plates 104A, 104B. The interior of the tube 108 is hollow. Cutouts 112A, 112B, for receiving the end plates 104A, 104B, respectively, are formed (e.g. machined) at each end of the tube 108. The width and depth of the cutouts 112A, 112B, are dependent upon the specific structure and dimensions of the end plates 104A, 104B.

The end plates 104A, 104B, can be mounted to the tube 108 using a number of different methods. For example, the end plates 104A, 104B, may be bonded to the tube 108 using an adhesive. Alternately, the end plates 104A, 104B, may be welded or bolted to the tube 108. A shrink-fit process may also be used.

As shown most clearly in FIG. 7, the tube 108 has an outer diameter (OD) and a wall thickness (T). In accordance with the present invention, the weight of the thin-wall external drum 100 has been reduced considerably, compared to related art external drums, by providing the tube 108 with a reduced wall thickness (T). In particular, in the present invention, the wall thickness (T) is less than or equal to about 1.5 percent of the outer diameter (OD) of the tube 108. This greatly reduces the moment of inertia of the thin-wall external drum 100 with respect to the axis of rotation 110, in turn reducing the rotary inertial load on the motor (not shown) used to rotate the external drum 100. Accordingly, a less-powerful (and less-expensive) motor can be used to rotate the external drum 100.

Figure 5:
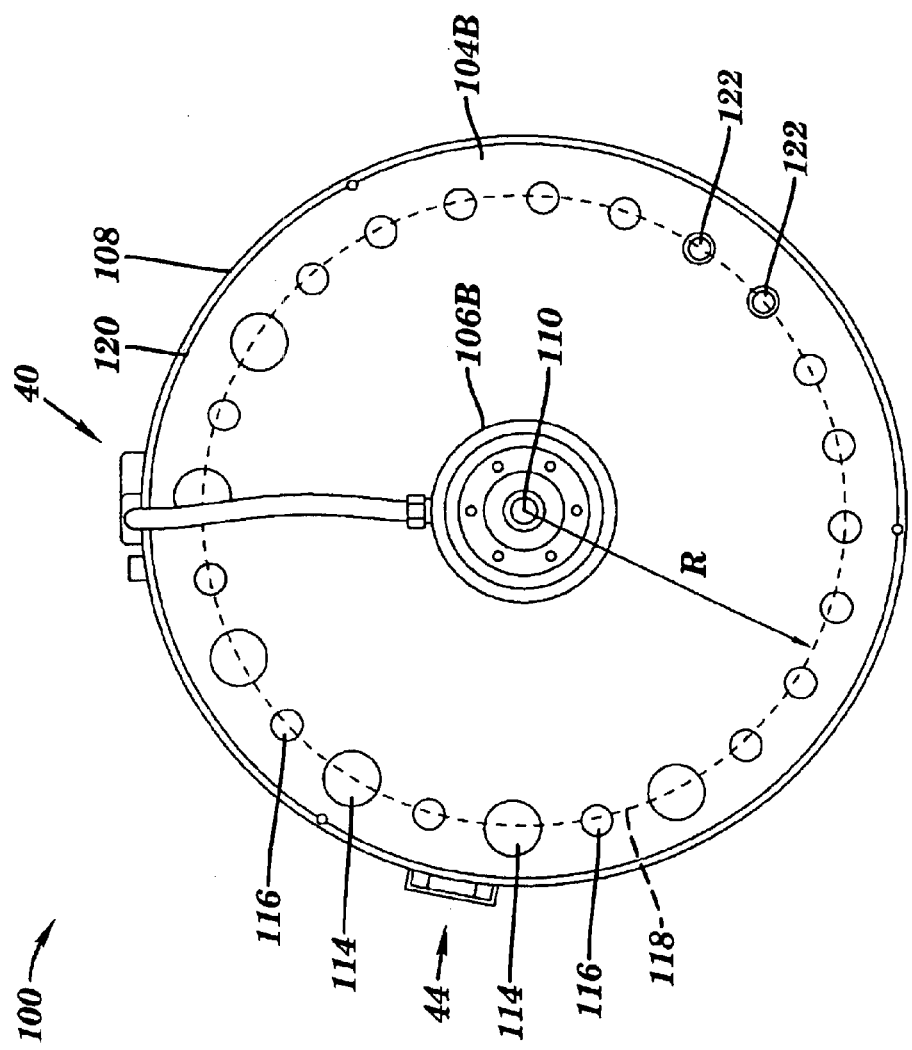
FIG. 5 is an end view of the thin-wall external drum of FIG. 3.

An end view of the thin-wall external drum 100 of the present invention is illustrated in FIG. 5. As shown, the end plate 104B includes a plurality of openings 114, 116, that are arranged about a circle 118 having a radius R from the axis of rotation 110 of the external drum 100. The end plate 104A (not shown) has a similar configuration. The openings 114 have a larger diameter than the openings 116. For example, each opening 114 may have a diameter of 1 inch, while each opening 116 may have a diameter of ½ inch. The openings 114, 116, serve several purposes. First, the openings 114, 116, which extend through the end plate 106B, provide drainage during the plating of the thin-wall hollow tube 108. Second, and more importantly, the openings 114, 116, are used to balance the thin-wall external drum 100 during rotation.

Figure 6:
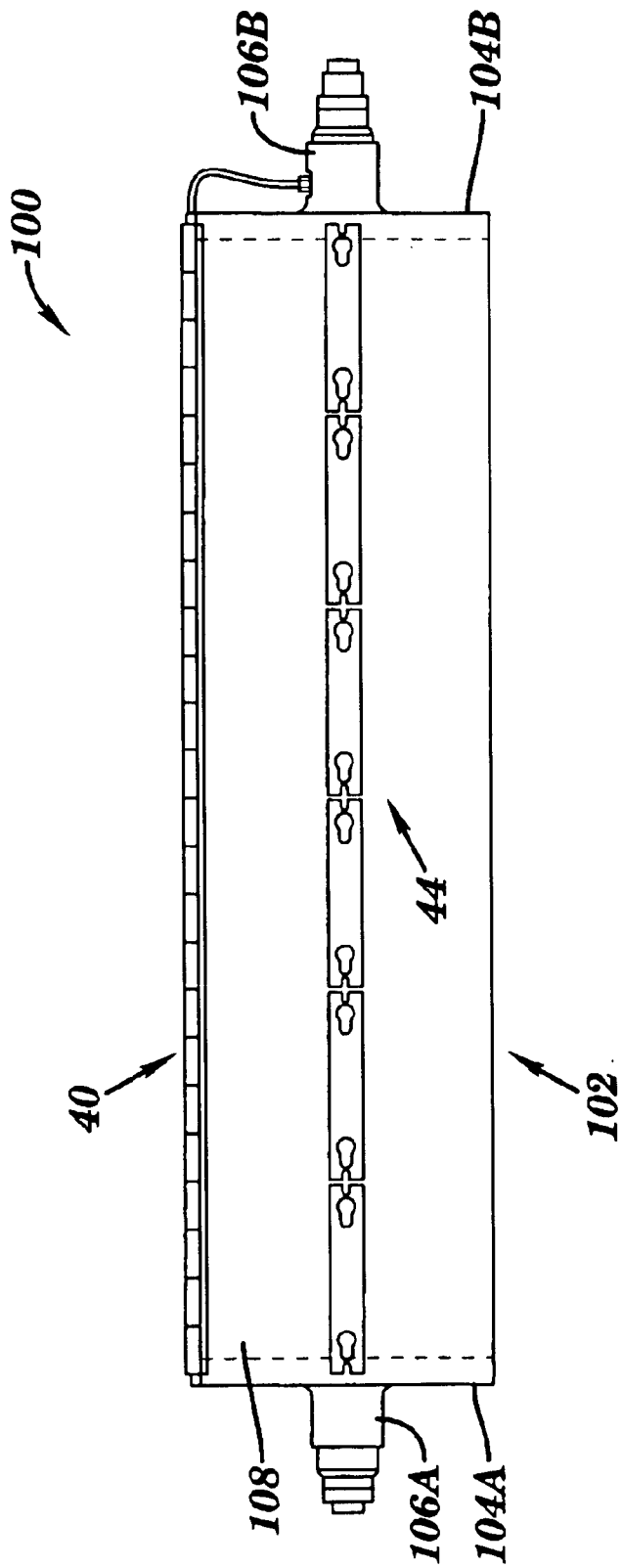
FIG. 6 illustrates the thin-wall external drum of the present invention with leading and trailing edge clamping mechanisms mounted thereon.
Figure 8:
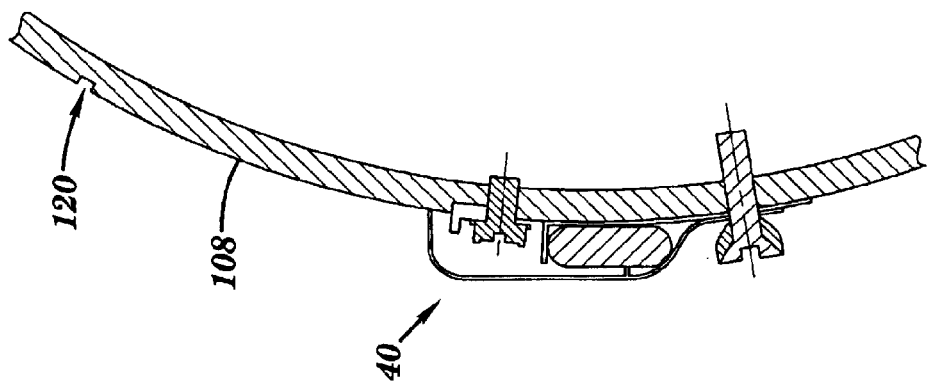
FIG. 8 is a partial cross-sectional view of the thin-wall external drum of FIG. 5.

In FIGS. 5, 6, and 8, a leading edge clamping mechanism 40 is shown mounted to the tube 108 of the thin-wall external drum 100. A trailing edge clamping mechanism 44 that is magnetically coupled to the tube 108 is shown in FIGS. 5 and 6. A plate edge detection groove 120, formed in the surface of the tube 108, is shown in FIGS. 5 and 8. Each of these components affects the rotational balance of the thin-wall external drum 100. Accordingly, the openings 114, 116, are strategically located to compensate for the difference in mass about the tube 108. In FIG. 5, for example, the larger openings 114 are clustered below the leading and trailing edge mechanisms 40, 44. This compensates for the increased mass of the leading and trailing edge mechanisms 40, 44. Weights 122 may also be used to balance the thin-wall external drum 100. Weights 122 may be secured within one or more of the openings 114, 116, using setscrews, adhesive, etc.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention.

We claim:

1. An apparatus, comprising: an external drum for supporting a printing plate to be imaged by an imaging system, wherein the external drum includes a cylindrical portion consisting of a hollow tube and a pair of end plates mounted to opposing sides of the hollow tube, and wherein the hollow tube has a wall thickness less than or equal to about 1.5 percent of the outside diameter of the external drum.

2. The apparatus of claim 1, wherein each end plate includes a journal.

3. The apparatus of claim 1, wherein each end plate comprises a plurality of different size openings for balancing the external drum during rotation and for providing drainage during a plating of the external drum.

4. The apparatus of claim 3, further comprising a leading edge clamping mechanism and a trailing edge clamping mechanism attached to the hollow tube, wherein the plurality of different size openings in each end plate balance a weight of the leading and trailing edge clamping mechanisms during rotation of the external drum.

5. The apparatus of claim 3, further including at least one weight, disposed within at least one of the plurality of different size openings, for balancing the external drum during rotation.

6. The apparatus of claim 1, wherein the hollow tube is reinforced only where the hollow tube is adjoined to an axis of rotation of the external drum.

7. An external drum platesetter, comprising:
   an external drum having a media support surface; and
   a scanning system for imaging data onto a printing plate mounted on the media support surface of the external drum wherein the external drum includes a cylindrical portion consisting of a hollow tube and a pair of end plates mounted to opposing sides of the hollow tube, and wherein the hollow tube has a wall thickness less than or equal to about 1.5 percent of the outside diameter of the external drum.

8. The external drum platesetter of claim 7, wherein each end plate includes a journal.

9. The external drum platesetter of claim 7, wherein each end plate comprises a plurality of different size openings for balancing the external drum during rotation and for providing drainage during a plating of the external drum.

10. The external drum platesetter of claim 9, further comprising:
    a leading edge clamping mechanism and a trailing edge clamping mechanism attached to the hollow tube, wherein the plurality of different size openings in each end plate balance a weight of the leading and trailing edge clamping mechanisms during rotation of the external drum.

11. The external drum platesetter of claim 9, further including at least one weight, disposed within at least one of the plurality of different size openings, for balancing the external drum during rotation.

12. The external drum platesetter of claim 7, wherein the hollow tube is reinforced only where the hollow tube is adjoined to an axis of rotation of the external drum.

* * * * *